Aug. 2, 1960  D. H. FISH  2,947,829
SAFETY FUSE
Filed Nov. 25, 1957
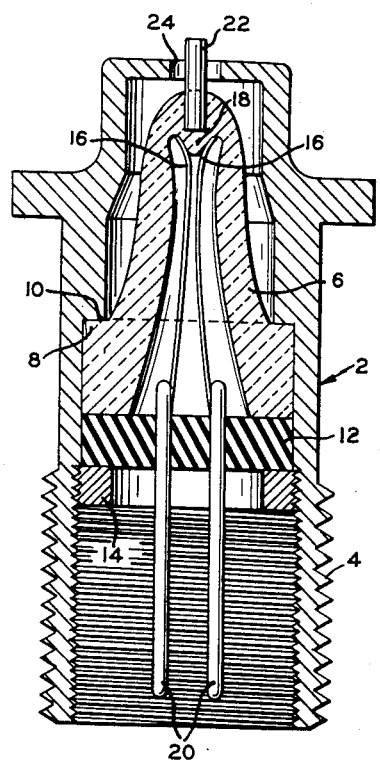
INVENTOR.
DONALD H. FISH
BY Karl Huber
James E. Bryan
ATTORNEYS

United States Patent Office 2,947,829
Patented Aug. 2, 1960

2,947,829

SAFETY FUSE

Donald H. Fish, Livingston, N.J., assignor, by mesne assignments, to Engelhard Industries, Inc., Newark, N.J., a corporation of Delaware Filed Nov. 25, 1957, Ser. No. 698,863

7 Claims. (Cl. 200—61.08)

This invention relates to a new type of safety fuse, particularly adapted for use as a protective device to detect and prevent damage due to overspeed and bearing failure such as are sometimes encountered in aircraft turbines. The device is, however, not restricted to aircraft or other turbine applications, but can be used in many other applications where the necessity of obtaining an electrical control is applicable to a transducing switch.

Safety fuses heretofore manufactured have served to open an electrical circuit in the event of actuation of the fuse. One type of such known fuse has a ceramic stem mounted within a metal housing, with an electrical conductor being mounted on the ceramic stem. When the tip of the ceramic stem is struck by a turbine blade, for example, the ceramic stem is fractured and the electrical contact is broken, thereby opening an electrical circuit which, in the case of an aircraft turbine, stops the engine.

In accordance with the present invention, a safety fuse is provided which closes an electrical circuit upon actuation of the fuse, which consists substantially of a pair of cooperating contacts mounted in a housing and bearing resiliently against a frangible stop member made suitably from an insulating material as a ceramic or the like. The stop member separates the contacts from each other during normal operating conditions of e.g. the engine in the case of an aircraft turbine. Upon fracture of the stop member, the contacts close an electrical circuit thereby stopping the engine.

Referring to the accompanying drawings, a view in longitudinal cross section through one embodiment of the invention is shown.

The fuse comprises a housing 2 which may be fabricated from any suitable material such as stainless steel, and which is generally cylindrical in shape. The housing is provided with an external thread 4 whereby it can be secured to a turbine housing, for example.

Within the housing 2, a hollow ceramic body 6 of substantially cup-like shape is mounted such that a circular shoulder 8 formed in the outer surface thereof rests upon the mating circular shoulder 10 machined into the housing 2. An insulating plug 12 is secured in place by an externally threaded ring 14, the threads of which cooperate with an internal thread in the housing 2, or by an expandable ring fitting into an internal groove in the case, or by other suitable means. The ceramic body 6 has the function of insulating the two contact blades 16 from each other. For this purpose, the inside wall of the body 6 is provided with a projection 18 at the apex thereof. The free ends of the spring contact blades 16 bear resiliently and in opposite directions against the projection 18, whereas the other ends of the blades are affixed, e.g. by welding, to the prongs 20 which pass through the plug 12. A standard plug may be inserted in the end of the housing 2 to make an electrical connection with the prongs 20.

The tip of the ceramic body 6 is provided with a pin 22 protruding through an aperture 24 in the housing 2, the pin having the function of an actuating member.

In the operation of the device of the invention, when mounted adjacent to the turbine in an aircraft engine, for example, the device is so mounted that there is very slight clearance between the turbine blades and the pin 22 so that, should a bearing failure occur, the pin will be struck, resulting in a fracture of the ceramic body 6. Thereby the separating projection 18 is removed, the preloaded blades 16 snap into a position wherein they contact each other and an electrical circuit is closed which may function, if desired, to stop the flow of fuel to the engine or to perform some other operation.

The device can also be operated when mounted adjacent to an overspeed mechanism operating from the turbine shaft, such that excessive shaft speed will cause a mechanism arm to swing out, thus striking the pin 22 and causing a fracture of the ceramic body 6.

It will be obvious to those skilled in the art that many modifications may be made within the scope of the present invention without departing from the spirit thereof, and the invention includes all such modifications.

What is claimed is:

1. A safety fuse comprising a housing, a hollow ceramic body in the housing, a plurality of cooperating contact blades in the ceramic body, the free ends of the contact blades bearing resiliently and from opposite directions against an inside projection of the hollow ceramic body, and means adapted when struck to fracture the ceramic body.

2. In a safety fuse, a hollow frangible insulator forming a cavity, a projection into said cavity formed by a re-entrant portion of the inside wall of the hollow insulator, a pair of cooperating contact elements mounted in said cavity at opposite sides of and separated by said projection, resilient means for biasing the contact elements against the projection, and means for fracturing said hollow insulator to remove the projection from its separating position with respect to the contact elements.

3. In a safety fuse, a hollow, frangible insulator having a base portion and a tip portion of reduced diameter, said insulator forming an elongated cavity terminating in a circular groove in the tip portion, the groove encircling a projection of the cavity walls, the projection protruding into said cavity, a pair of contact blades arranged longitudinally in the cavity to extend from said base through the cavity into said groove, the free ends of the blades bearing resiliently and from opposite directions against and being separated by said projection, and means when struck for fracturing at least the tip portion of the insulator to remove the projection and permit closure of the contact blades.

4. In a safety fuse, a housing, a hollow, frangible insulator having an open base portion and a tip portion of reduced diameter mounted in said housing, said insulator forming an elongated cavity terminating in a circular groove in the tip portion, the groove encircling a projection of the cavity walls, the projection protruding axially into said cavity, an insulating plug mounted in the housing adjacent the open base portion of said insulator, a pair of contact blades secured to said plug to extend longitudinally through said cavity and into said groove, the free ends of the blades bearing resiliently and from opposite directions against and separated by said projection, and a pin partly embedded into said tip portion and protruding therefrom and outside of the housing through an aperture in said housing.

5. In a safety fuse, a housing having an opening in its surface, a frangible insulating spacing member mounted in said housing, a pair of cooperating contact elements mounted at opposite sides of the spacing member, resilient means for biasing at least one of the contact elements against the spacing member, and an actuating element embedded in said frangible insulating member and extending through the opening in said housing for fracturing said member to remove it from its position with respect to the contact elements.

6. A safety fuse comprising a housing, a plurality of cooperating electrical contact blades mounted in the housing, the contact blades bearing resiliently and from opposite directions directly against a frangible stop member and means embedded in the frangible member and extending through the housing for fracturing the frangible member to permit closure of the contact.

7. A safety fuse comprising a housing, a plurality of cooperating electrical contact blades mounted in the housing and biased toward contacting each other, a frangible stop member arranged inside said housing, at least one of the contact blades bearing resiliently and directly against said stop member, and actuating means mounted in co-operative proximity to said member and extending through said housing for breaking said frangible member to permit closure of the contact blades when said actuating means is subject to a mechanical impulse.

References Cited in the file of this patent
UNITED STATES PATENTS

| | | |
|---|---|---|
| 426,917 | Chambers | Apr. 29, 1890 |
| 1,539,635 | Biggs | May 26, 1925 |
| 1,940,176 | Marshall | Dec. 19, 1933 |
| 2,352,692 | Dann | July 4, 1944 |
| 2,414,912 | Wiatt | Jan. 28, 1947 |